Figure 1:
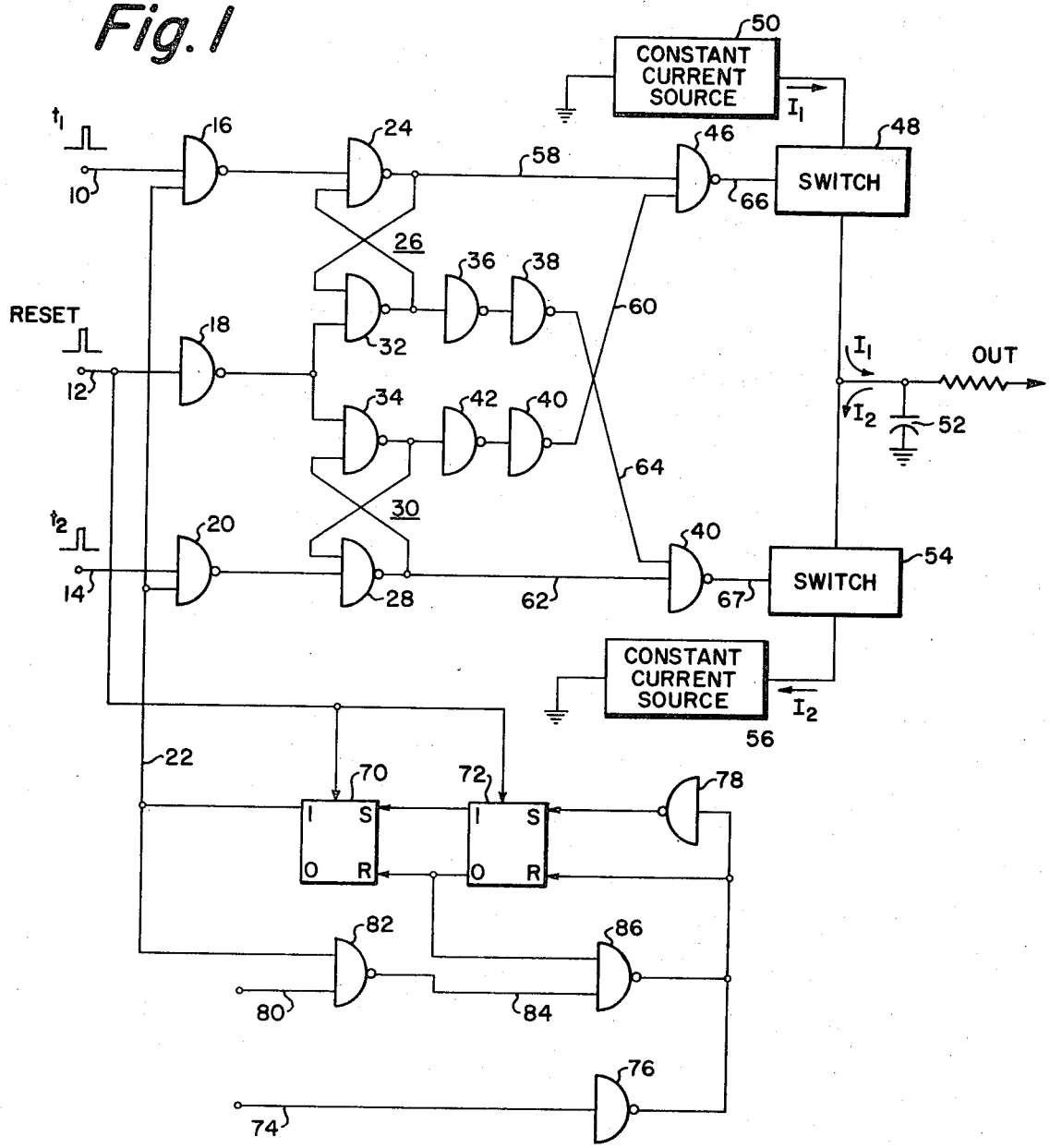

United States Patent
Zerby

[15] 3,641,443
[45] Feb. 8, 1972

[54] FREQUENCY COMPENSATED PULSE TIME DISCRIMINATOR

[72] Inventor: John C. Zerby, Houston, Tex.
[73] Assignee: Westinghouse Electric Corporation, Pittsburgh, Pa.
[22] Filed: Dec. 11, 1969
[21] Appl. No.: 884,159

[52] U.S. Cl. ..........................328/109, 307/232, 307/233, 307/246, 328/129, 343/5 DP
[51] Int. Cl. ......................................................H03k 5/20
[58] Field of Search ..................235/150.26, 150.27, 151.32; 307/225, 232, 233, 234, 246, 271; 328/109, 110, 129; 343/5 DP

[56] References Cited

UNITED STATES PATENTS

| | | | |
|---|---|---|---|
| 2,886,775 | 5/1959 | Gross | 328/129 X |
| 3,250,923 | 5/1966 | Liska et al. | 307/271 X |
| 3,418,495 | 12/1968 | Bose | 307/246 X |
| 3,475,062 | 10/1969 | Crittenden et al. | 307/234 X |

Primary Examiner—Donald D. Forrer
Assistant Examiner—R. C. Woodbridge
Attorney—F. H. Henson

[57] ABSTRACT

A pulse time discriminator for radar applications and the like adapted to measure the time or phase difference between pulses in two trains of pulses by the use of flip-flop and NAND circuit components only, and incorporating means for maintaining the transfer function and offset current of the discriminator substantially constant.

4 Claims, 5 Drawing Figures

FREQUENCY COMPENSATED PULSE TIME DISCRIMINATOR

CROSS-REFERENCES TO RELATED APPLICATIONS

Application, Ser. No. 549,252, filed May 11, 1966 for Time Discriminator in the names of William B. Crittenden and Susan T. Utara, and assigned to the Assignee of the present application, now U.S. Pat. No. 3,475,062.

BACKGROUND OF THE INVENTION

While not limited thereto, the present invention is particularly adapted for use in radar systems of the type capable of tracking a target by first locking onto the target and continuing to supply information as the position of the target. Such radar systems include time discriminator circuits which compare the time of occurrence of a target echo with the time of occurrence of one or more gate pulses generated in the radar system. Any change in time relationship between the signals associated with the target echo and the gate pulse is sensed and converted to an error signal which is usually used in a feedback servosystem for controlling antenna position or the like.

In certain time discriminators of the prior art, the interval between successive events or pulses is measured by charging a capacitor and then measuring the output voltage upon the capacitor to determine the lapsed time. However, the charge on the capacitor varies linearly with the charging time only for a small fraction of its charging cycle. This establishes the linear range of the discriminator system. When the interval between the signal exceeds the linear range of the system, the output signal drops to zero so that the information derived from the discriminator system is ambiguous in that a zero reading may indicate either the receipt of no signals or the receipt of signals at intervals exceeding the linear range of the system.

In U.S. Pat. No. 3,475,062, filed May 11, 1966 and assigned to the Assignee of the present application, a time discriminator circuit is described which eliminates many of the disadvantages of time discriminators utilizing a charging capacitor only. Briefly, this is accomplished in accordance with the teachings of said application by circuitry including flip-flops and OR circuits interconnected such that when a pulse is received in one train before that in another, a first output pulse is derived whose leading edge coincides with the pulse in said one train while its trailing edge coincides with the pulse in the other train. Similarly, when a pulse is received in the other train before said one train, a second output signal is derived whose leading edge coincides with the pulse in the other train while its trailing edge coincides with the pulse in the first train. By integrating these pulses with opposite polarities, a direct current output is derived whose magnitude is indicative of the time difference between the pulses and whose polarity indicates whether the pulse in the first or second train arrived first.

Since the pulse time discriminator operates on sampled data and has a pulsed output current, its transfer function is proportional to the sampling rate. Furthermore, since the various circuit elements used in the time discriminator have different delay times, the time discriminator will usually have an offset current (i.e., the nonzero output current which exists when the time error at the input is zero). Since this offset current also appears as a pulsed current, its magnitude is proportional to the sampling frequency.

In most feedback control applications, it is desirable to keep both the transfer function and the offset current constant. A constant transfer function is desirable for considerations of loop bandwidth and stability; whereas constant offset current is desirable for steady-state accuracy. On the other hand, if a sampled data control system employing a time discriminator of the type described above is required to operate with more than one sampling rate, the above parameters will change when the sampling rate is changed.

SUMMARY OF THE INVENTION

In accordance with the present invention, the transfer function of a pulse time discriminator as well as its offset current are maintained substantially constant by counting the pulses fed into the discriminator and by eliminating a portion of the input pulses in suitable gating circuitry, depending upon the frequency of the input pulses and, hence, the sampling rate. As the sampling rate increases, the gating circuit is disabled for progressively longer periods of time. In this manner, the transfer function and offset current, depending upon frequency change, are maintained substantially constant. The output from the time discriminator, however, is still proportional to the difference in time between pulses in two pulse trains.

Figure 2A:
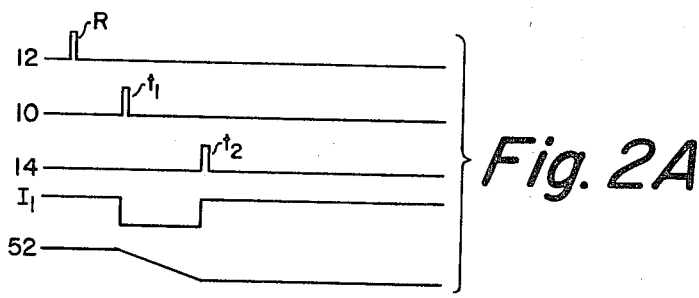
Figure 2B:
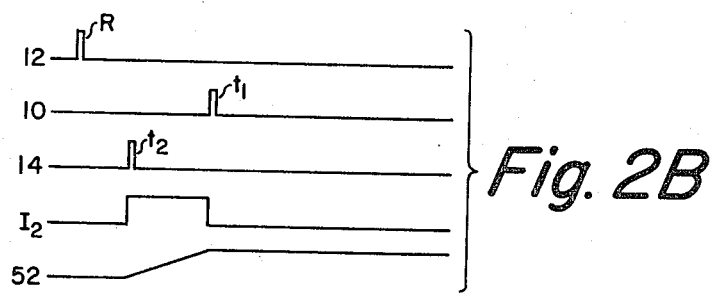
Figure 2C:
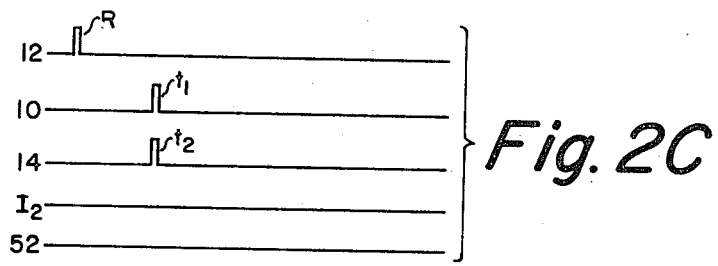
Figure 3:
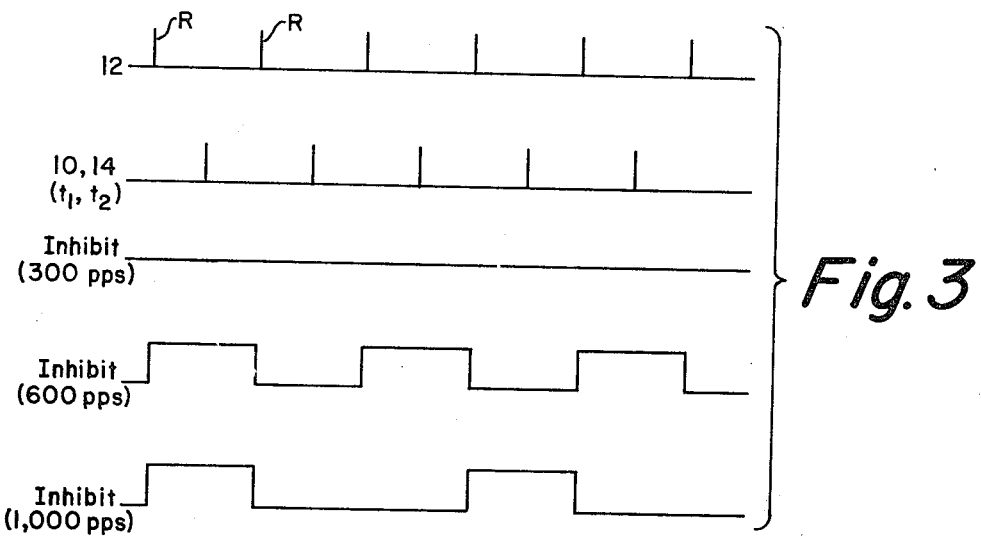

The above and other objects and features of the invention will become apparent from the following detailed description taken in connection with the accompanying drawings which form a part of this specification, and in which:

FIG. 1 is a schematic circuit diagram of a time discriminator employing the principles of the invention;

FIGS. 2A, 2B and 2C comprise waveforms illustrating the operation of the time discriminator of FIG. 1; and FIG. 3 comprises waveforms illustrating the operation of the frequency compensating digital circuitry of the invention.

With reference now to the drawings, and particularly to FIG. 1, the circuit shown includes three input terminals 10, 12 and 14 connected to NAND-circuit-elements 16, 18 and 20, respectively. The NAND-circuit-element 18 acts as an inverter only; while NAND-circuit-elements 16 and 20 are connected to a lead 22 such that the output from these elements will change only when all input signals are of one polarity or condition as will hereinafter be explained.

The output of the NAND-circuit 16 is connected to the input of one NAND-element 24 of a first flip-flop unit 26. Similarly, the output of the NAND-element 20 is connected to the input of NAND-element 28 of a second flip-flop unit 30. The flip-flop unit 26 includes a second NAND-element 32 having its output connected to the input of NAND-element 24 and its input connected to the output of NAND-element 24. Similarly, flip-flop unit 30 includes a second NAND-circuit-element 34 having its output connected to the input of NAND-element 28 and its input connected to the output of NAND-element 28.

The output of NAND-element 32 is connected through NAND-elements 36 and 38 to a NAND-element 40 having an input also connected to the output of the NAND-element 28 in flip-flop unit 30. Similarly, the output of the NAND-element 34 is connected through NAND-elements 42 and 44 to the input of NAND-element 46 along with the output of NAND-element 24. NAND-element 46 controls a normally closed switch 48 connected between a constant current source 50 and an integrating capacitor 52. Similarly, NAND-element 40 controls a normally closed switch 54 connected between a constant current source 55 and the capacitor 52. Note that the currents from sources 50 and 56 are reversed, meaning that when switch 48 is closed and switch 54 is open, the capacitor charges with one polarity; whereas when the reverse condition persists, the capacitor charges with the opposite polarity.

As is well known, digital signals are usually referred to as ON or OFF, "1" or "0," or possibly positive or negative. In the logic notation used herein, a "1" signal will be assumed to be positive; whereas a "0" signal will be assumed to be negative. Furthermore, as is well known to those skilled in the art, a NAND circuit is one in which the output will be "0" or negative only when all of its inputs have "1" or positive signals applied thereto. At all other times, the output of the NAND circuit will be "1" or positive.

In the operation of the circuit of FIG. 1, it will be assumed that the signal on lead 22 is normally a "1." If the signals applied to all of the input terminals 10, 12 and 14 are "0," a "1" signal will appear at the output of all of the NAND-elements 16, 18 and 20. This causes the output of the NAND-element 24 on lead 58 to be "0" and the output of NAND-element 44 on lead 60 to be "1." This results in a "1" output from circuit 46 causing the switch 48 to remain closed. Similarly, the output of NAND-element 28 on lead 62 will be "0" and the output of NAND-element 38 on lead 64 will be "1," meaning that the output of NAND-element 40 will also be "1." "1" signals will not open the normally open switches 48 and 54 and, consequently, the switches 48 and 54 remain closed under the circumstances just described. This serves to rest the circuit in a manner hereinafter described such that the signals applied to switches 48 and 54 are both "1" with the switches being open or disabled.

Following the application of the reset pulse to terminal 12 in FIG. 2A, a pulse $t_1$ may be applied to NAND-element 16. Since it is assumed that the lead 22 has a "1" signal applied thereto, and since the pulse applied to terminal 10 is now also "1" the output of NAND-circuit 16 changes to "0." This removes the condition wherein two "1" signals are applied to the input of NAND-element 24 and, consequently, the output of NAND-element 24 switches from "0" to "1." At the same time, the output from NAND-element 24 is applied to the input of NAND-element 32 such that it now has two "1" signals applied to its input with its output assuming a "0" condition. This also applies a "0" signal to lead 64 which, along with the "0" signal on lead 62 causes the output of NAND-element 40 to remain in the "1" condition where the switch 54 is disabled or open.

At this time, however, the signal on lead 60 from NAND-element 44 is "1;" and since the signal on lead 58 is also "1," the output of NAND-element 46 changes from "1" to "0" whereby the switch 48 is closed and current $I_1$ flows into the capacitor 52.

The foregoing condition persists until a pulse $t_2$ is applied to terminal 14 a time following the pulse $t_1$. NAND-element 20 now has two "1" signals applied to its input such that its output is now "0." This causes the flip-flop unit 30 to switch stable states since NAND-element 28 no longer has two "1" inputs applied thereto. As a result, the output of NAND-element 34 switches from "1" to "0" as does the output of NAND-element 44 on lead 60. NAND-element 46 now has a "1" and a "0" signal applied to its input such that its output changes from "0" to "1," causing the switch 48 to open. The resulting voltage appearing across the capacitor 52 is shown by the last waveform in FIG. 2A.

Before any further pulses are applied to terminals 10 and 14, a reset pulse will be applied to terminal 12, causing the output of NAND-element 18 to change from "1" to "0." This causes both NAND-elements 32 and 34 to have "1" outputs; and since these outputs are applied to the inputs of NAND-elements 24 and 28 along with "0" signals from NAND-elements 16 and 20, the flip-flops 26 and 30 are switched back to their original states preparatory to the receipt of succeeding pulses on terminals 10 and 12.

Now, let us assume that the pulse $t_2$ applied to terminal 14 arrives before pulse $t_1$ applied to terminal 10 as shown in FIG. 2B. Under these circumstances, the NAND-element 20 will initially have two "1" signals applied to its inputs whereby its output switches from "1" to "0," thereby causing the output of element 28 in flip-flop 30 to switch from "0" to "1." This causes the output from flip-flop 40 to switch from "1" to "0," thereby closing the switch 54. This condition will persist until the pulse $t_1$ arrives, whereupon the output of NAND-element 40 on lead 67 drops to zero, the resulting voltage across capacitor 52 being a positive-going ramp.

In FIG. 2C, the condition is shown wherein the pulses $t_1$ and $t_2$ are applied to input terminals 10 and 14 simultaneously. Under these conditions, both flip-flop units 26 and 30 switch at the same time, whereby a "0" and "1" signal will be applied to the inputs of both NAND-elements 40 and 46 and the switches 48 and 54 will remain in their previous conditions with the result that no current flows into the capacitor 52.

The voltage existing across the capacitor 52, therefore, will be proportional to the time difference between the pulses $t_1$ and $t_2$ and its polarity will be indicative of whether the pulse $t_1$ or $t_2$ occurred first. As was mentioned above, since the pulse time discriminator of FIG. 1 operates on sampled data and has a pulsed output current, its transfer function is proportional to the sampling rate, $f$. That is:

$$G = K_1 f$$

where $G$ is the transfer function and $K_1$ is a constant. Because the various gates as well as the current switches have different delay times, the time discriminator of FIG. 1 will usually have an offset current which is the nonzero output current which exists when the time error at the input is zero (i.e., $t_2 - t_1 = 0$). Since this offset current also appears as a pulsed current, its magnitude, $I_0$, is proportional to sampling frequency. Thus:

$$I_0 = K_2 f$$

where $K_2$ is constant. In most feedback control applications, it is desirable to keep both the transfer function and offset current constant. Constant transfer function is desirable for considerations of loop bandwidth and stability; while constant offset current is desirable for steady-state accuracy.

In accordance with the present invention, the transfer function and offset current are maintained substantially constant by means of apparatus for varying the magnitude of the current sources according to the sampling rate. This includes a pair of flip-flop circuits 70 and 72 having applied thereto the reset pulses on input terminal 12. Each flip-flop 70 or 72 can be set by a "1" signal on terminal S such that the condition of its two output terminals will reverse each time a reset pulse is applied, and a reset terminal R which, when a "1" signal is applied thereto, will maintain the condition of the two output terminals of the flip-flop constant regardless of the number of input pulses applied thereto from terminal 12.

In the system of FIG. 1, compensation for sampling rates of 300, 600 or 1,000 samples per second is provided. When 300 samples per second are being used, the output enabling signal from flip-flop 70 remains a "1" signal and the NAND-elements 16, 18 and 20 are constantly enabled. When the sampling rate reaches 600 per second, a "1" signal is applied to terminal 74 which, through NAND-element 76, applies a "0" signal to the R terminal of flip-flop 72 and through NAND-element 78 applies a "1" signal to the S terminal of flip-flop 72. The flip-flops 72 and 70 will now switch from one stable state to the other each time a reset pulse is applied, thereby producing waveform 22A of FIG. 3 on lead 22. In this manner, the system inhibits the gating during alternate sampling periods. Thus, the effective rate is kept at 300 and the transfer function and leakage current are unchanged. Without the inhibit signal, however, both the transfer function and leakage current would double. When a sampling rate of 1,000 is used, a "1" signal is applied to input terminal 80; and when the inhibit signal on lead 22 is also "1", a NAND-element 82 will produce a "0" signal on lead 84. This, together with the signal on the "0" terminal of flip-flop 72, causes NAND-element 86 to alter the operation of the flip-flops 70 and 72 to produce the waveform 22B of FIG. 3. The result is that two out of every three samples are now inhibited, giving an effective sampling rate of 333. In this case, the compensation is approximate, but is adequate for most situations.

The present invention thus provides a means for compensating for differences in transfer function and leakage current or differences in frequency without complicating the precision part of the circuit. That is, the digital-to-analog converter itself is not varied. No additional switching is required in this area, nor is any additional precision circuitry required. When the digital-to-analog circuitry is designed with the initial offset balanced out and other refinements such as temperature compensation included, it need not be further altered as a function of sampling rate. Thus, the most critical part of the circuit is kept as simple as possible. The necessary switching is performed in the noncritical digital part of the circuitry by common, inexpensive components (i.e., flip-flops and NAND gates).

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In a time discriminator of the type in which pulses in two trains of pulses are compared in digital circuitry to produce output pulses whose widths are proportional to the time difference between sets of pulses in the respective trains, and including means for integrating said output pulses to produce a signal whose magnitude is a function of the time difference between said pulses in the respective trains; the improvement of means for maintaining the transfer function and leakage current of said discriminator essentially constant over a range of pulse repetition frequencies, comprising means for gating input pulses in said trains before they are applied to said time discriminator, and means for disabling said gating means for increasingly longer periods of time as the pulse repetition frequency increases.

2. The improvement of claim 1 wherein said integrating means produces a signal of one polarity when a pulse in one train leads that in the other, and a signal of the other polarity when a pulse in said other train leads a pulse in said one train.

3. The improvement of claim 1 wherein said gating means comprises NOR circuit elements.

4. The improvement of claim 3 wherein said means for disabling said gates is formed from NAND circuit elements and flip-flops.

* * * * *